United States Patent
Tamaoka et al.

(10) Patent No.: US 9,523,373 B2
(45) Date of Patent: Dec. 20, 2016

(54) FAN

(71) Applicant: Nidec Corporation, Kyoto (JP)

(72) Inventors: Takehito Tamaoka, Kyoto (JP); Kazuhiko Fukushima, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 65 days.

(21) Appl. No.: 14/499,680

(22) Filed: Sep. 29, 2014

(65) Prior Publication Data

US 2015/0198176 A1     Jul. 16, 2015

(30) Foreign Application Priority Data

Jan. 14, 2014   (JP) .................................. 2014-004557

(51) Int. Cl.
| | |
|---|---|
| *G06F 1/20* | (2006.01) |
| *F04D 29/58* | (2006.01) |
| *F04D 25/06* | (2006.01) |
| *F04D 17/16* | (2006.01) |
| *F04D 29/42* | (2006.01) |

(52) U.S. Cl.
CPC ........... *F04D 29/5853* (2013.01); *F04D 17/16* (2013.01); *F04D 25/062* (2013.01); *F04D 25/0613* (2013.01); *F04D 29/422* (2013.01); *G06F 1/203* (2013.01)

(58) Field of Classification Search
CPC ............. G06F 1/20; F04D 29/58; F04D 17/08
USPC ............. 361/679.48, 679.49, 679.5; 417/352
See application file for complete search history.

(56) References Cited

U.S. PATENT DOCUMENTS

| | | | | |
|---|---|---|---|---|
| 5,810,554 | A | * | 9/1998 | Yokozawa ............ F04D 29/582 |
| | | | | 415/176 |
| 9,360,019 | B2 | * | 6/2016 | Tamaoka .............. F04D 25/062 |
| 2002/0057022 | A1 | | 5/2002 | Yamamoto |

(Continued)

FOREIGN PATENT DOCUMENTS

| | | |
|---|---|---|
| CN | 2498381 Y | 7/2002 |
| CN | 2561975 Y | 7/2003 |

(Continued)

OTHER PUBLICATIONS

Tamaoka et al., "Cooling Apparatus"; U.S. Appl. No. 14/483,843, filed Sep. 11, 2014.

(Continued)

*Primary Examiner* — Dion R Ferguson
*Assistant Examiner* — Mandeep S Buttar
(74) *Attorney, Agent, or Firm* — Westerman, Hattori, Daniels & Adrian, LLP

(57) ABSTRACT

A blower fan includes a lower plate portion made of a material having a thermal conductivity of 1.0 W/(m·K) or more, and a side wall portion made of a material having a thermal conductivity of 1.0 W/(m·K) or more. An upper plate portion arranged to cover an upper side of the impeller includes an air inlet. The upper plate portion, the side wall portion, and the lower plate portion are arranged to together define an air outlet on the lateral side of the impeller. The blower fan further includes a heat source contact portion with which a heat source is to be in contact, the heat source contact portion being arranged in a surface of the blower fan which faces away from the impeller. The heat source contact portion and the side wall portion are arranged to at least partially overlap with each other in a plan view.

12 Claims, 10 Drawing Sheets

(56) References Cited

U.S. PATENT DOCUMENTS

| | | |
|---|---|---|
| 2004/0114327 A1 | 6/2004 | Sri-Jayantha et al. |
| 2007/0086168 A1 | 4/2007 | Khanna et al. |
| 2008/0130226 A1* | 6/2008 | Yamashita ............ F04D 29/281 361/695 |
| 2008/0159853 A1 | 7/2008 | Khanna et al. |
| 2008/0180914 A1 | 7/2008 | Khanna et al. |
| 2008/0225488 A1 | 9/2008 | Khanna et al. |
| 2009/0174050 A1 | 7/2009 | Bernstein et al. |
| 2009/0199997 A1 | 8/2009 | Koplow |
| 2010/0177480 A1 | 7/2010 | Koplow |
| 2011/0103011 A1 | 5/2011 | Koplow |
| 2011/0123318 A1 | 5/2011 | Khanna et al. |
| 2012/0180992 A1 | 7/2012 | Koplow |

FOREIGN PATENT DOCUMENTS

| | | |
|---|---|---|
| CN | 2616732 Y | 5/2004 |
| CN | 101217859 A | 7/2008 |
| CN | 102112939 A | 6/2011 |
| EP | 0569738 A1 | 11/1993 |
| EP | 2329337 A1 | 6/2011 |
| JP | 2000-283089 A | 10/2000 |
| JP | 2001-057493 A | 2/2001 |
| JP | 2001-111277 A | 4/2001 |
| JP | 2011-530191 A | 12/2011 |
| WO | 2010/016963 A1 | 2/2010 |

OTHER PUBLICATIONS

Tamaoka et al., "Fan", U.S. Appl. No. 14/498,551, filed Sep. 26, 2014.

* cited by examiner

FAN

BACKGROUND OF THE INVENTION

1. Field of the Invention

The present invention relates to a blower fan.

2. Description of the Related Art

Electronic devices, such as notebook PCs, produce a large amount of heat at CPUs and the like inside cases thereof. This makes it important to take measures against the heat. One common measure against the heat is to install blower fans inside the cases to discharge the heat.

In recent years, electronic devices have been becoming more and more sophisticated in functionality, accompanied by a considerable increase in the temperature inside the electronic devices. Accordingly, there is a demand for a blower fan which is excellent in cooling capability, with the view of cooling an interior of such an electronic device. A fan unit disclosed in JP-A 2001-111277 is arranged to discharge an air through an air outlet arranged radially outside blades so that the air can be blown to a heat-radiating component mounted on a circuit board arranged radially outside the blades. The heat-radiating component is thus directly cooled.

However, in recent years, electronic devices have been becoming more and more densely packed with electronic components, and heat may not be sufficiently discharged out of such a recent electronic device only by blowing an air to a heat source.

The present invention has been conceived to provide a blower fan which is able to efficiently cool a heat source.

SUMMARY OF THE INVENTION

A blower fan according to a preferred embodiment of the present invention includes an impeller, a motor portion, and a housing. The impeller includes a plurality of blades and a blade support portion. The blades are arranged to rotate about a central axis extending in a vertical direction, and are arranged in a circumferential direction. The blade support portion is arranged to support the blades. The motor portion is arranged to rotate the impeller. The housing is arranged to contain the impeller. The housing includes a lower plate portion and a side wall portion. The lower plate portion is arranged to cover a lower side of the impeller, is arranged to support the motor portion, and is made of a material having a thermal conductivity of 1.0 W/(m·K) or more. The side wall portion is arranged to cover a lateral side of the impeller, is connected with the lower plate portion, and is made of a material having a thermal conductivity of 1.0 W/(m·K) or more. A channel joining a space above the impeller and a space between the impeller and the lower plate portion to each other in an axial direction is defined between adjacent ones of the blades of the impeller. An upper plate portion arranged to cover an upper side of the impeller includes an air inlet. The upper plate portion, the side wall portion, and the lower plate portion are arranged to together define an air outlet on the lateral side of the impeller. The blower fan further includes a heat source contact portion with which a heat source is to be in contact, the heat source contact portion being arranged in a surface of the blower fan which faces away from the impeller. The air outlet is a plane parallel to the central axis, and including one of an edge of the upper plate portion, a pair of edges of the side wall portion, and an edge of the lower plate portion that is the closest to the central axis. The heat source contact portion and the side wall portion are arranged to at least partially overlap with each other in a plan view.

The present invention is able to provide a blower fan which is capable of efficiently cooling a heat source.

The above and other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
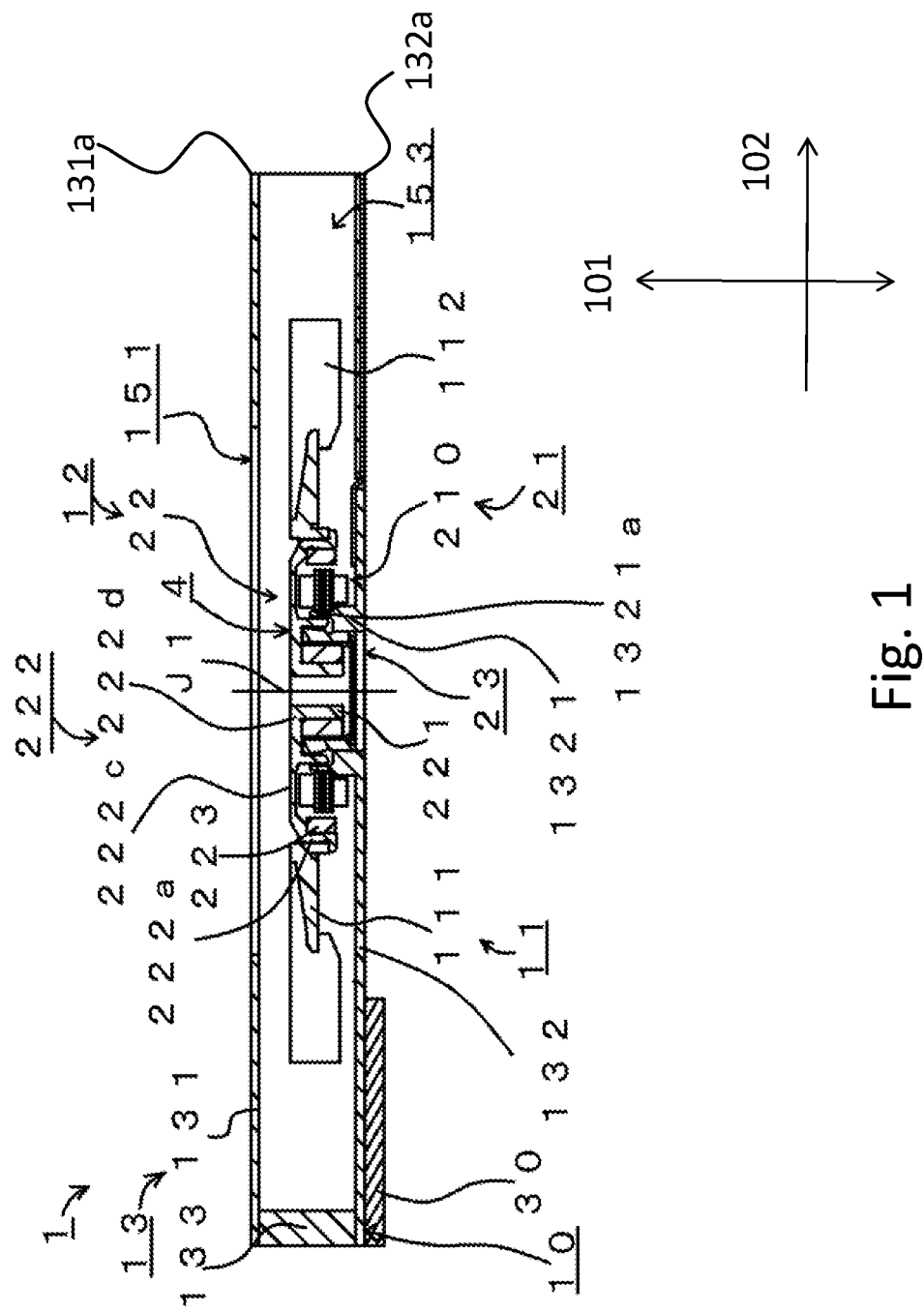
FIG. 1 is a cross-sectional view of a blower fan according to a first preferred embodiment of the present invention.

It is assumed herein that a vertical direction 101 is defined as a direction in which a central axis of a motor portion extends, and that an upper side and a lower side along the central axis in FIG. 1 are referred to simply as an upper side and a lower side, respectively. It should be noted, however, that the above definitions of the vertical direction and the upper and lower sides should not be construed to restrict relative positions or directions of different members or portions when the motor portion is actually installed in a device. Also note that a direction parallel to the central axis is referred to by the term "axial direction", "axial", or "axially", that radial directions centered on the central axis are simply referred to by the term "radial direction", "radial", or "radially", and that a circumferential direction 102 about the central axis is simply referred to by the term "circumferential direction", "circumferential", or "circumferentially".

FIG. 1 is a cross-sectional view of a blower fan 1 according to a first preferred embodiment of the present invention. The blower fan 1 according to the present preferred embodiment is a centrifugal fan, and is used, for example, in a notebook personal computer in which a heat source 30, i.e., a CPU or another electronic component which is another heat-radiating component, is arranged directly on the blower fan 1 to cool the CPU or the other electronic component. The blower fan 1 includes an impeller 11, a motor portion 12, and a housing 13. The impeller 11 is arranged to extend radially outward from a rotating portion 22 of the motor portion 12. The impeller 11 is caused by the motor portion 12 to rotate about a central axis J1.

The impeller 11 is made of a resin having excellent thermal conductivity (hereinafter referred to as a "heat conductive resin"), and includes a plurality of blades 112 arranged in a circumferential direction, and a substantially annular blade support portion 111 arranged to support the blades 112. An inner circumferential surface of the blade support portion 111 is fixed to the rotating portion 22 of the motor portion 12. The blades 112 are arranged to extend radially outward from an outer circumferential surface of the blade support portion 111 with the central axis J1 as a center. The blade support portion 111 and the blades 112 are defined as a single continuous member by a resin injection molding process. Note that the impeller 11 may be made of aluminum. A heat in the heat source 30 is transferred to the impeller 11 through the housing 13 and the motor portion 12. Rotation of the impeller 11 enables dissipation of the heat. In the case where the impeller 11 is made of the heat conductive resin, the impeller 11 is capable of rotating at a higher speed, since the heat conductive resin has a specific gravity smaller than that of aluminum. Air volume is thereby increased, and an improvement in cooling performance is achieved. The heat conductive resin is preferably a resin including a metal filler, and in this case, a further improvement in the cooling performance is achieved. Note that the impeller 11 is preferably arranged to have a thermal conductivity of 1.0 W/(m·K) or more. More preferably, the impeller 11 is arranged to have a thermal conductivity of 3.0 W/(m·K) or more.

The blower fan 1 is arranged to produce air currents through the rotation of the impeller 11 about the central axis J1 caused by the motor portion 12.

The housing 13 is arranged to contain the motor portion 12 and the impeller 11. The housing 13 includes an upper plate portion 131, a mounting plate 132 (hereinafter referred to as a lower plate portion 132), and a side wall portion 133. The upper plate portion 131 is a substantially plate-shaped member made of a metal. The upper plate portion 131 is arranged above the motor portion 12 and the impeller 11 to cover an upper side of the impeller 11. The upper plate portion 131 includes one air inlet 151 arranged to pass therethrough in a vertical direction. The air inlet 151 is arranged to axially overlap with at least a portion of the impeller 11 and the entire motor portion 12. The air inlet 151 is substantially circular, and the central axis J1 passes therethrough. At least one pair of adjacent ones of the blades 112 are arranged to define a channel therebetween, the channel joining a space axially above the blades 112 and a space between the blades 112 and the lower plate portion 132 to each other in an axial direction. The channel is arranged to be open toward an upper surface of the lower plate portion 132. Thus, an air sucked through the air inlet 151 passes between the adjacent blades 112 of the impeller 11 toward the lower plate portion 132. The lower plate portion 132 and the heat source 30 are in thermal contact with each other. The thermal contact between the lower plate portion 132 and the heat source 30 enables a heat to be transferred from the heat source 30 to the lower plate portion 132. That is, since the air sucked through the air inlet 151 passes between the adjacent blades 112 of the impeller 11 toward the lower plate portion 132, a wind strikes the lower plate portion 132 to achieve an improvement in the cooling performance.

The lower plate portion 132 is a substantially plate-shaped member produced by subjecting a metal sheet to press working. The lower plate portion 132 is arranged below the motor portion 12 and the impeller 11 to support the motor portion 12. According to the present preferred embodiment, the lower plate portion 132 is made of aluminum. In this case, the heat can be dissipated through the lower plate portion 132. Note that a material of the lower plate portion 132 may be copper, an aluminum alloy, iron, an iron-base alloy (including SUS), or a heat conductive resin.

The blower fan 1 includes, in a surface thereof facing away from the impeller 11, a heat source contact portion 10 with which the heat source 30 is to be in contact. The heat source 30 is the CPU or the other electronic component which is the other heat-radiating component. According to the present preferred embodiment, an upper surface of the heat source 30 is arranged to be in thermal contact with a lower surface of the lower plate portion 132. The heat source 30 and the lower plate portion 132 are arranged to be in close contact with each other with a heat-conducting member, such as grease or a thermal sheet which is a portion of the heat source 30, arranged therebetween, and this heat-conducting member causes the heat source 30 and the lower surface of the lower plate portion 132 to be in thermal contact with each other. Note that the heat source contact portion 10 may be arranged at a location different from the lower plate portion 132, as described below.

The side wall portion 133 is made of a resin. The side wall portion 133 is arranged to cover a lateral side of the impeller 11. That is, the side wall portion 133 is arranged radially outside the blades 112 to surround the blades 112. The upper plate portion 131 is fixed to an upper end portion of the side wall portion 133 through screws or by another fixing method. A lower end portion of the side wall portion 133 is joined to the lower plate portion 132 by an insert molding process. The side wall portion 133 is arranged substantially in the shape of the letter "U" when viewed in a direction parallel to the central axis J1, and includes an air outlet 153 which opens radially outward. In more detail, portions of the upper and lower plate portions 131 and 132 are arranged on an upper side and a lower side, respectively, of an opening of the side wall portion 133. The air outlet 153 is a plane parallel to the central axis J1 and including one of an edge of the upper plate portion 131, a pair of edges which are circumferential ends of the opening of the side wall portion 133, and an edge of the lower plate portion 132 that is the closest to the central axis J1. The air outlet 153 is defined by edges 131a, 132a, 133a of the upper plate portion 131, the lower plate portion 132 and the side wall portion 133. According to the present preferred embodiment, an area enclosed by the upper and lower plate portions 131 and 132 and the opening of the side wall portion 133 is the air outlet 153. Note that the side wall portion 133 may not necessarily be provided by the insert molding process. Also note that the side wall portion 133 may not necessarily be made of the resin. Also note that each of the upper and lower plate portions 131 and 132 may be fixed to the side wall portion 133 by a fixing method not mentioned above.

Figure 2:
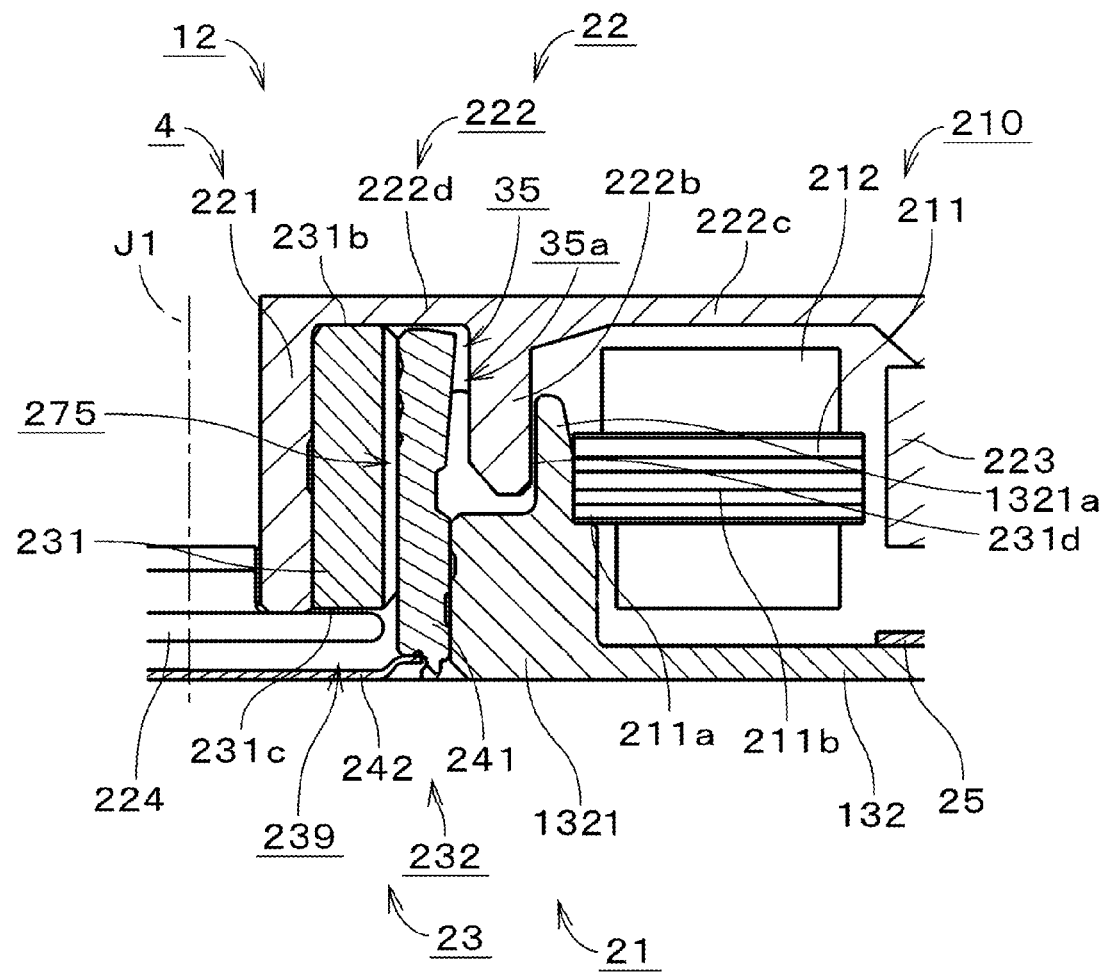
FIG. 2 is a cross-sectional view of a motor portion and its vicinity according to the first preferred embodiment.

FIG. 2 is a cross-sectional view of the motor portion 12 and its vicinity. The motor portion 12 is of an outer-rotor type. The motor portion 12 includes a stationary portion 21 and the rotating portion 22. The stationary portion 21 includes a bearing portion 23, the lower plate portion 132, a stator 210, and a circuit board 25.

The bearing portion 23 is arranged radially inward of the stator 210. The bearing portion 23 includes a sleeve 231 and a bearing housing 232. The sleeve 231 is substantially cylindrical in shape and centered on the central axis J1. The sleeve 231 is a metallic sintered body. The sleeve 231 is impregnated with a lubricating oil. A plurality of circulation grooves 275, each of which is arranged to extend in the axial direction and through each of which the lubricating oil circulates, are defined in an outer circumferential surface of the sleeve 231. The circulation grooves 275 are arranged at regular intervals in the circumferential direction. The bearing housing 232 is substantially cylindrical and has a bottom, and includes a housing cylindrical portion 241 and a cap 242. The housing cylindrical portion 241 is substantially cylindrical in shape and centered on the central axis J1, and is arranged to cover the outer circumferential surface of the sleeve 231. The sleeve 231 is fixed to an inner circumferential surface of the housing cylindrical portion 241 through an adhesive. The bearing housing 232 is made of a metal. The cap 242 is fixed to a lower end portion of the housing cylindrical portion 241. The cap 242 is arranged to close a bottom portion of the housing cylindrical portion 241. Note that use of the adhesive to fix the sleeve 231 to the inner circumferential surface of the housing cylindrical portion 241 is not essential to the present invention. For example, the sleeve 231 may be fixed to the inner circumferential surface of the housing cylindrical portion 241 through press fit. Note that each of the sleeve 231, the bearing housing 232, and the cap 242 may be made of a nonmetallic material having excellent thermal conductivity. For example, each of the sleeve 231, the bearing housing 232, and the cap 242 may be made of a heat conductive resin or brass.

The lower plate portion 132 includes a rising portion 1321 in a radially inner portion thereof. The rising portion 1321 is a substantially annular portion. A lower region of an outer circumferential surface of the housing cylindrical portion 241, i.e., a lower region of an outer circumferential surface of the bearing housing 232, is fixed to an inner circumferential surface of the rising portion 1321 through adhesion or press fit. Note that both adhesion and press fit may be used to fix the bearing housing 232 and the rising portion 1321 to each other.

The stator 210 is a substantially annular member centered on the central axis J1. The stator 210 includes a stator core 211 and a plurality of coils 212 arranged on the stator core 211. The stator core 211 is defined by laminated silicon steel sheets, each of which is in the shape of a thin sheet. The stator core 211 includes a substantially annular core back 211a and a plurality of teeth 211b arranged to project radially outward from the core back 211a. A conducting wire is wound around each of the teeth 211b to define the coils 212. The circuit board 25 is arranged below the stator 210. Lead wires of the coils 212 are electrically connected to the circuit board 25. The circuit board 25 is a flexible printed circuit (FPC) board.

The rotating portion 22 includes a shaft 221, a thrust plate 224, a rotor holder 222, and a rotor magnet 223. The shaft 221 is arranged to have the central axis J1 as a center thereof.

Referring to FIG. 1, the rotor holder 222 is arranged substantially in the shape of a covered cylinder and centered on the central axis J1. The rotor holder 222 includes a tubular "cylindrical magnet holding portion" 222a, a cover portion 222c, and a first thrust portion 222d. The cylindrical magnet holding portion 222a, the cover portion 222c, and the first thrust portion 222d are defined integrally with one another. The first thrust portion 222d is arranged to extend radially outward from an upper end portion of the shaft 221. The cover portion 222c is arranged to extend radially outward from the first thrust portion 222d. The upper plate portion 131 is arranged above the cover portion 222c and the first thrust portion 222d. A lower surface of the cover portion 222c is a substantially annular surface arranged around the shaft 221. Referring to FIG. 2, the first thrust portion 222d is arranged axially opposite each of an upper surface 231b of the sleeve 231 and an upper surface of the housing cylindrical portion 241.

The thrust plate 224 includes a substantially disk-shaped portion arranged to extend radially outward. The thrust plate 224 is fixed to a lower end portion of the shaft 221, and is arranged to extend radially outward from the lower end portion thereof. The thrust plate 224 is accommodated in a plate accommodating portion 239 defined by a lower surface 231c of the sleeve 231, an upper surface of the cap 242, and a lower portion of the inner circumferential surface of the housing cylindrical portion 241. An upper surface of the thrust plate 224 is a substantially annular surface arranged around the shaft 221. The upper surface of the thrust plate 224 is arranged axially opposite the lower surface 231c of the sleeve 231, i.e., a downward facing surface in the plate accommodating portion 239. Hereinafter, the thrust plate 224 will be referred to as a "second thrust portion 224". A lower surface of the second thrust portion 224 is arranged opposite to the upper surface of the cap 242 of the bearing housing 232. The shaft 221 is inserted in the sleeve 231. Note that the thrust plate 224 may be defined integrally with the shaft 221. The thrust plate 224 is made, for example, of a metal, such as stainless steel.

The shaft 221 is defined integrally with the rotor holder 222. The shaft 221 and the rotor holder 222 are produced by subjecting a metallic member to a cutting process. That is, the cover portion 222c and the shaft 221 are continuous with each other. Note that the shaft 221 may be defined by a member separate from the rotor holder 222. In this case, the upper end portion of the shaft 221 is fixed to the cover portion 222c of the rotor holder 222. Referring to FIG. 1, the rotor magnet 223 is fixed to an inner circumferential surface of the cylindrical magnet holding portion 222a, which is arranged to extend axially downward from a radially outer end portion of the cover portion 222c of the rotor holder 222. The shaft 221 is made, for example, of a metal, such as stainless steel.

Referring to FIG. 2, the rotor holder 222 further includes a substantially annular "annular tubular portion" 222b arranged to extend downward from an outer edge portion of the first thrust portion 222d. The annular tubular portion 222b will be hereinafter referred to as a "rotor cylindrical portion 222b". The rotor cylindrical portion 222b of the rotor holder 222 is arranged radially inward of the stator 210. The rotor cylindrical portion 222b is arranged radially outward of the bearing housing 232. An inner circumferential surface of the rotor cylindrical portion 222b is arranged radially opposite an outer circumferential surface of an upper portion of the housing cylindrical portion 241. A seal gap 35 is defined between the inner circumferential surface of the rotor cylindrical portion 222b and the outer circumferential surface of the housing cylindrical portion 241. A seal portion 35a having a surface of the lubricating oil defined therein is defined in the seal gap 35.

Referring to FIG. 1, the inner circumferential surface of the blade support portion 111 is fixed to an outer circumferential surface of the cylindrical magnet holding portion 222a of the rotor holder 222. The blades 112 are arranged outside the outer circumferential surface of the cylindrical magnet holding portion 222a. The upper end portion of the shaft 221 is fixed to the impeller 11 through the rotor holder 222. Note that the impeller 11 may be defined integrally with the rotor holder 222. In this case, the upper end portion of the shaft 221 is fixed to the impeller 11 in a direct manner.

The rotor magnet 223 is substantially cylindrical in shape and centered on the central axis J1. As described above, the rotor magnet 223 is fixed to the inner circumferential surface of the cylindrical magnet holding portion 222a. The rotor magnet 223 is arranged radially outside the stator 210.

Referring to FIG. 2, the rising portion 1321 includes a rising upper tubular portion 1321a arranged to project upward at an upper end thereof. An outer circumferential surface of the rotor cylindrical portion 222b is arranged opposite to an inner circumferential surface of the rising upper tubular portion 1321a with a radial gap (hereinafter referred to as a minute gap 231d) intervening therebetween. Entrance and exit of a gas through this minute gap 231d are limited. This contributes to reducing evaporation of the lubricating oil through the seal portion 35a. The radial width of the minute gap 231d is arranged to be 0.15 mm or less than 0.15 mm. More preferably, the radial width of the minute gap 231d is arranged to be 0.10 mm or less than 0.10 mm.

Figure 3:
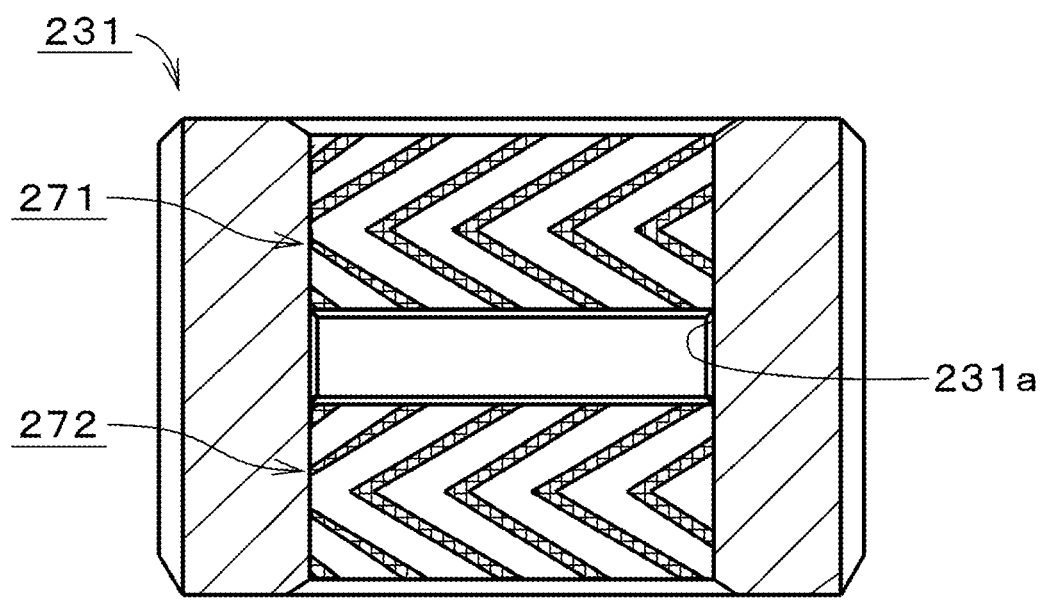
FIG. 3 is a cross-sectional view of a sleeve according to the first preferred embodiment.
Figure 4:
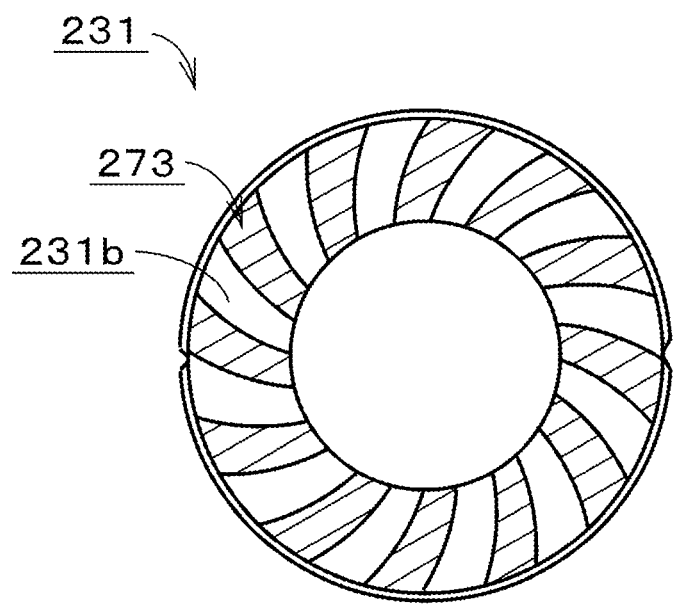
FIG. 4 is a plan view of the sleeve.
Figure 5:
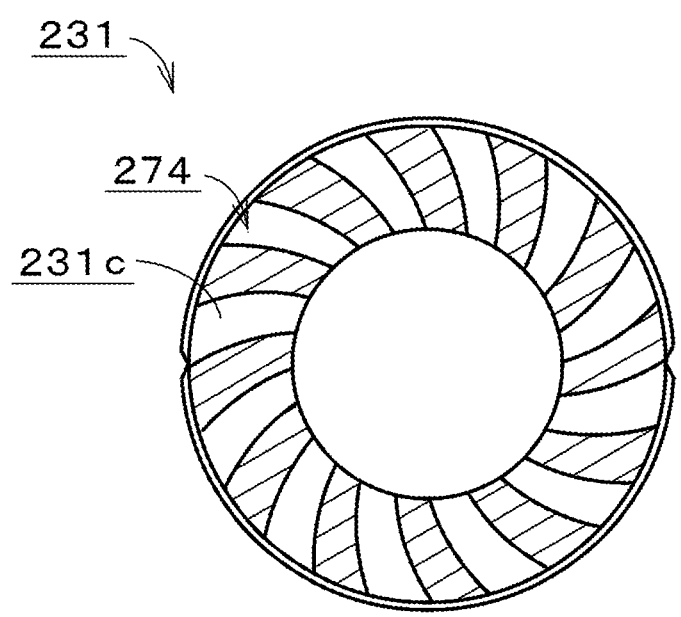
FIG. 5 is a bottom view of the sleeve.

FIG. 3 is a cross-sectional view of the sleeve 231. A first radial dynamic pressure groove array 271 and a second radial dynamic pressure groove array 272 are defined in an upper portion and a lower portion, respectively, of an inner circumferential surface 231a of the sleeve 231. Each of the first and second radial dynamic pressure groove arrays 271 and 272 is made up of a plurality of grooves arranged in a herringbone pattern. FIG. 4 is a plan view of the sleeve 231. A first thrust dynamic pressure groove array 273 is defined in the upper surface 231b of the sleeve 231. The first thrust dynamic pressure groove array 273 is made up of a plurality of grooves arranged in a spiral pattern. FIG. 5 is a bottom view of the sleeve 231. A second thrust dynamic pressure groove array 274 is defined in the lower surface 231c of the sleeve 231. The second thrust dynamic pressure groove array 274 is made up of a plurality of grooves arranged in the spiral pattern.

Figure 6:
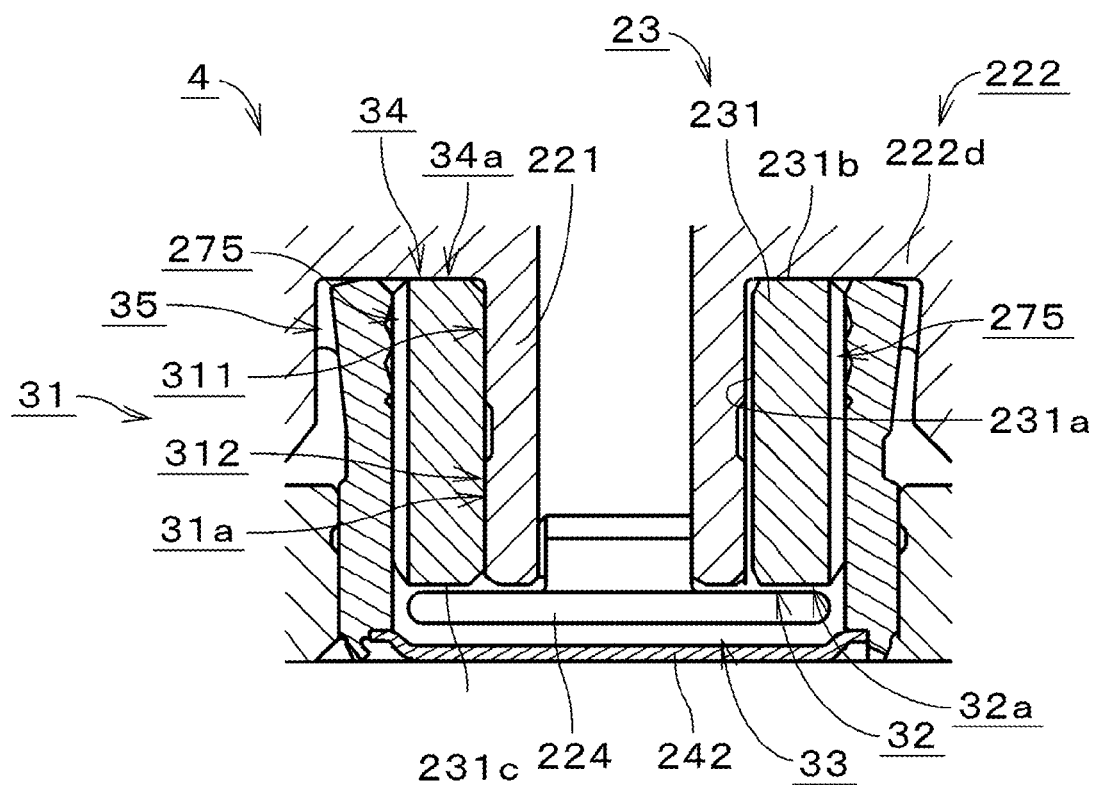
FIG. 6 is a cross-sectional view of a bearing portion and its vicinity according to the first preferred embodiment.

FIG. 6 is a cross-sectional view of the bearing portion 23 and its vicinity. A radial gap 31 is defined between an outer circumferential surface of the shaft 221 and the inner circumferential surface 231a of the sleeve 231. The radial gap 31 includes a first radial gap 311 and a second radial gap 312, which is arranged on a lower side of the first radial gap 311. The first radial gap 311 is defined between the outer circumferential surface of the shaft 221 and a portion of the inner circumferential surface 231a of the sleeve 231 in which the first radial dynamic pressure groove array 271 illustrated in FIG. 3 is defined. The lubricating oil is arranged in the first radial gap 311. The second radial gap 312 is defined between the outer circumferential surface of the shaft 221 and a portion of the inner circumferential surface 231a of the sleeve 231 in which the second radial dynamic pressure groove array 272 illustrated in FIG. 3 is defined. The lubricating oil is arranged in the second radial gap 312. The first and second radial gaps 311 and 312 are arranged to together define a radial dynamic pressure bearing portion 31a arranged to produce a fluid dynamic pressure in the lubricating oil. The shaft 221 is supported in a radial direction by the radial dynamic pressure bearing portion 31a. The radial width of the radial gap 31 is arranged to be 5 μm or less than 5 μm. More preferably, the radial width of the radial gap 31 is arranged to be 3 μm or less than 3 μm.

A thrust portion (not shown) includes the first thrust portion 222d, which is an upper thrust portion, and the second thrust portion 224, which is a lower thrust portion. A first thrust gap 34 is defined between a portion of the upper surface 231b of the sleeve 231 in which the first thrust dynamic pressure groove array 273 is defined and a lower surface of the first thrust portion 222d. The lubricating oil is arranged in the first thrust gap 34. The first thrust gap 34 is arranged to define an upper thrust dynamic pressure bearing portion 34a arranged to produce a fluid dynamic pressure in the lubricating oil. The first thrust portion 222d is supported in the axial direction by the upper thrust dynamic pressure bearing portion 34a. The axial width of the first thrust gap 34 is arranged to be 70 μm or less than 70 μm. More preferably, the axial width of the first thrust gap 34 is arranged to be 45 μm or less than 45 μm.

A second thrust gap 32 is defined between a portion of the lower surface 231c of the sleeve 231 in which the second thrust dynamic pressure groove array 274 is defined and the upper surface of the second thrust portion 224. The lubricating oil is arranged in the second thrust gap 32. The second thrust gap 32 is arranged to define a lower thrust dynamic pressure bearing portion 32a arranged to produce a fluid dynamic pressure in the lubricating oil. The second thrust portion 224 is supported in the axial direction by the lower thrust dynamic pressure bearing portion 32a. The upper and lower thrust dynamic pressure bearing portions 34a and 32a are arranged to be in communication with each other through the circulation grooves 275.

A third thrust gap 33 is defined between the upper surface of the cap 242 of the bearing housing 232 and the lower surface of the second thrust portion 224. The third thrust gap 33 may be arranged to produce a fluid dynamic pressure in the lubricating oil between the upper surface of the cap 242 and the lower surface of the second thrust portion 224.

In the motor portion 12, the seal gap 35, the first thrust gap 34, the radial gap 31, the second thrust gap 32, and the third thrust gap 33 are arranged to together define a single continuous bladder structure, and the lubricating oil is arranged continuously in this bladder structure. Within the bladder structure, a surface of the lubricating oil is defined only in the seal gap 35.

Referring to FIG. 2, in the motor portion 12, the shaft 221, the first thrust portion 222d, the rotor cylindrical portion 222b, which is arranged to extend downward from the outer edge portion of the first thrust portion 222d, the second thrust portion 224, the bearing portion 23, the rising portion 1321, and the lubricating oil are arranged to together define a bearing mechanism 4, which is a bearing apparatus. Hereinafter, each of the shaft 221, the first thrust portion 222d, the rotor cylindrical portion 222b, the second thrust portion 224, the bearing portion 23, and the rising portion 1321 will be referred to as a portion of the bearing mechanism 4. In the bearing mechanism 4, the shaft 221, the first thrust portion 222d, and the second thrust portion 224 are arranged to rotate relative to the bearing portion 23 with the lubricating oil intervening therebetween.

In the motor portion 12, once power is supplied to the stator 210, a torque centered on the central axis J1 is produced between the rotor magnet 223 and the stator 210. The rotating portion 22 and the impeller 11 are supported through the bearing mechanism 4 illustrated in FIG. 2 such that the rotating portion 22 and the impeller 11 are rotatable about the central axis J1 with respect to the stationary portion 21. The rotation of the impeller 11 causes an air to be drawn into the housing 13 through the air inlet 151 and then sent out through the air outlet 153.

Figure 7:
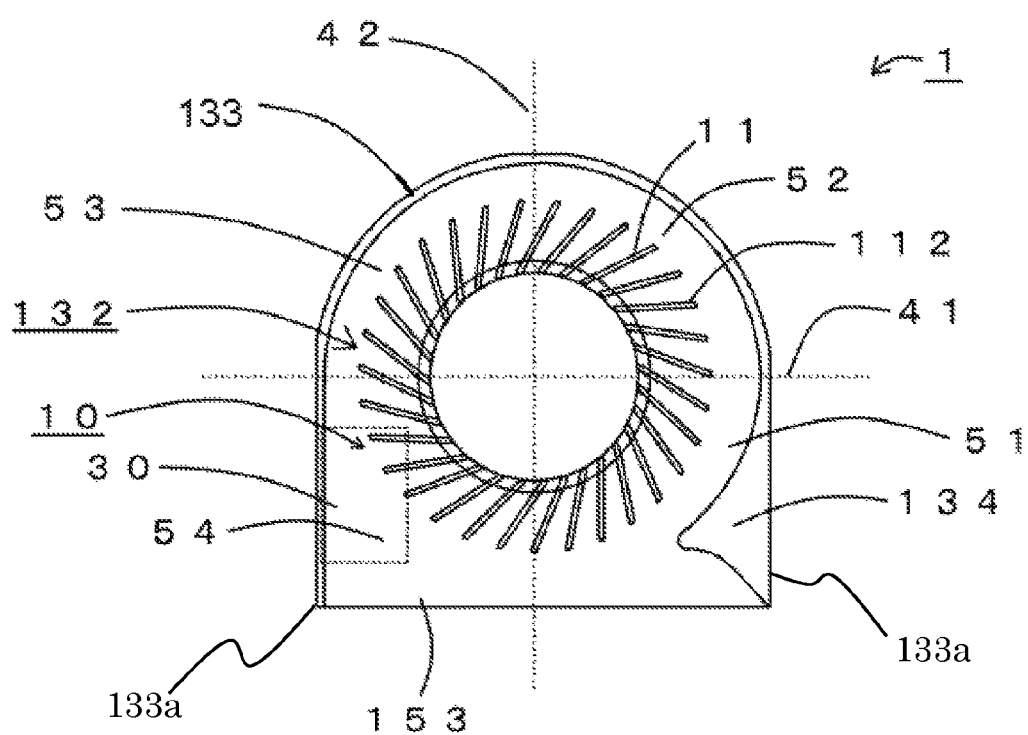
FIG. 7 is a top view of the blower fan with an upper plate portion removed therefrom.

FIG. 7 is a top view of the blower fan 1 with the upper plate portion 131 removed therefrom. The heat source contact portion 10 and the side wall portion 133 are arranged to at least partially overlap with each other in a plan view. This enables a heat originating from the heat source 30 to be efficiently transferred to both the side wall portion 133 and the lower plate portion 132. There are two air currents caused by the rotation of the impeller 11. A first air current is an air current which flows in the circumferential direction from the tongue portion 134 toward the air outlet 153 as described above. A second air current is an air current which flows radially from the air inlet 151 toward the side wall portion 133 along the blades 112. Regarding the second air current, since the circumferential velocity of each blade 112 increases with increasing distance from the central axis J1, an air current around the impeller 11 becomes fastest at a radially outer end, that is, in the vicinity of the side wall portion 133. That is, an effect of forced cooling caused by the air current is greatest in the vicinity of a radially outermost end of the lower plate portion 132 and the side wall portion 133. Therefore, a heat which is present at each of the radially outermost end of the lower plate portion 132 and an inner circumferential surface of the side wall portion 133 can be efficiently discharged. In addition, each of the lower plate portion 132 and the side wall portion 133 is made of a material having a thermal conductivity of 1.0 W/(m·K) or more. When each of the side wall portion 133 and the lower plate portion 132 is made of a material having a high thermal conductivity, a surface area through which the heat can be dissipated is increased in the vicinity of the radially outermost end of the lower plate portion 132 and the side wall portion 133, where the flow velocity of the air current is high. Accordingly, an improvement in heat dissipation performance is achieved.

A portion of the heat source contact portion 10 is arranged radially inward of the inner circumferential surface of the side wall portion 133 in the plan view. When a portion of the heat source contact portion 10 is arranged radially inward of the inner circumferential surface of the side wall portion 133, a heat is transferred from the heat source 30 to the lower plate portion 132, and the temperature of the lower plate portion 132 is increased. As mentioned above, the flow velocity of the air current caused by the rotation of the impeller 11 is highest in a region in the vicinity of the radially outermost end of the lower plate portion 132 and the side wall portion 133. Since an air current having a high flow velocity impinges on the region in the vicinity of the radially outermost end of the lower plate portion 132 and the side wall portion 133, a heat transferred to each of the lower plate portion 132 and the side wall portion 133 is dissipated with increased efficiency. Note that, in the case where the entire heat source 30 cannot be arranged in a region inside an outer circumference of the side wall portion 133 because, for example, another electronic component is arranged under the lower plate portion 132, a portion of the heat source contact portion 10 may be arranged radially outward of the outer circumference of the side wall portion 133.

The area of a region over which the heat source contact portion 10 and the side wall portion 133 overlap with each other in the plan view is arranged to be smaller than the area of a region of the heat source contact portion 10 radially inside the inner circumferential surface of the side wall portion 133. In this case, a heat is more easily transferred from the heat source 30 to the lower plate portion 132 than in the case where the entire heat source 30 is arranged on a lower surface of the side wall portion 133. That is, the surface area through which the heat can be dissipated can be increased in the vicinity of the radially outermost end of the lower plate portion 132 and the side wall portion 133, where the flow velocity of the air current is high, by increasing the area of a region over which the heat source contact portion 10 axially overlaps with the lower plate portion 132. Accordingly, a further improvement in the heat dissipation performance is achieved.

Further, in the plan view, an imaginary straight line which is parallel to the air outlet 153 and which intersects with the central axis J1 is defined as a first imaginary straight line 41, and an imaginary straight line which is perpendicular to the air outlet 153 and which intersects with the central axis J1 is defined as a second imaginary straight line 42. Of four regions divided by the first and second imaginary straight lines 41 and 42, a region in which the tongue portion 134 is arranged is defined as a first region 51, and the three other regions are defined as a second region 52, a third region 53, and a fourth region 54 in an order in which the three regions are arranged in a rotation direction of the impeller 11 from the first region 51. In this case, the heat source contact portion 10 is arranged in the fourth region 54. As mentioned above, the rotation of the impeller 11 of the blower fan 1 causes an air to flow downstream along the rotation direction of the impeller 11. At this time, the tongue portion 134 is at an upstream end, and the air outlet 153 is at a downstream end. Regarding the blower fan 1, as the air current travels downstream, the flow velocity of the air current increases, and the amount of heat carried thereby also increases. Here, since the heat source contact portion 10 is arranged in the fourth region 54, the temperature of the lower plate portion 132 is increased in the fourth region 54. Meanwhile, in an entire region outside the fourth region 54, the temperature of the lower plate portion 132 is low, and accordingly, the temperature of an air current passing therein is low. The entire region outside the fourth region 54 is an upstream region in which the tongue portion 134 is arranged, and the air current having a low temperature will pass the fourth region 54. Accordingly, arrangement of the heat source contact portion 10 in the fourth region 54 makes it possible to reduce the temperature of the air current passing the fourth region 54, and leads to an improvement in the cooling performance.

The heat source contact portion 10 and the blades 112 are arranged to at least partially overlap with each other in the plan view. A region radially outside an outer circumference of the blade support portion 111 is a region in which air currents caused by the rotation of the impeller 11 flow. An air sucked through the air inlet 151 passes between the adjacent blades 112 of the impeller 11 toward the lower plate portion 132. Thus, when the heat source contact portion 10 is arranged to axially overlap with the blades 112, an improvement in the cooling performance is achieved.

Figure 8:
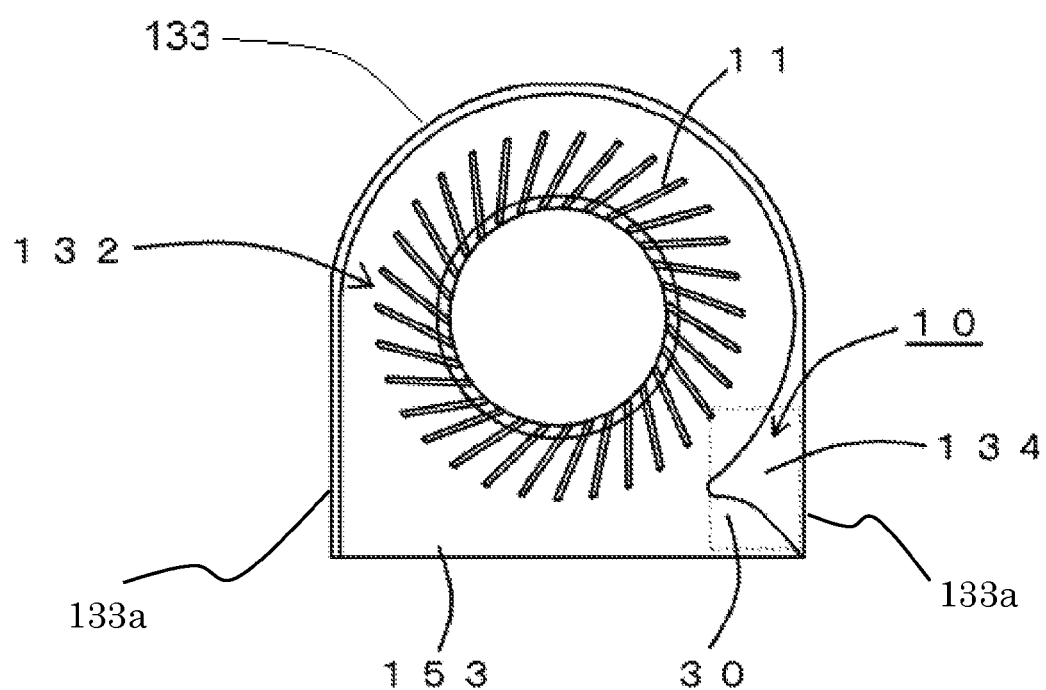
FIG. 8 is a top view of a blower fan according to an example modification of the first preferred embodiment with an upper plate portion removed therefrom.

FIG. 8 is a top view of a blower fan according to an example modification of the above-described preferred embodiment with an upper plate portion 131 removed therefrom. A side wall portion 133 includes a tongue portion 134 arranged to project between an air outlet 153 and an impeller 11. A heat source contact portion 10 and the tongue portion 134 may be arranged to at least partially overlap with each in a plan view. The tongue portion 134 is greater in volume than a remaining portion of the side wall portion 133. Improvements in heat transfer performance and the cooling performance can be achieved by increasing the area of a region over which the heat source contact portion 10 and the tongue portion 134 axially overlap with each other.

Figure 9:
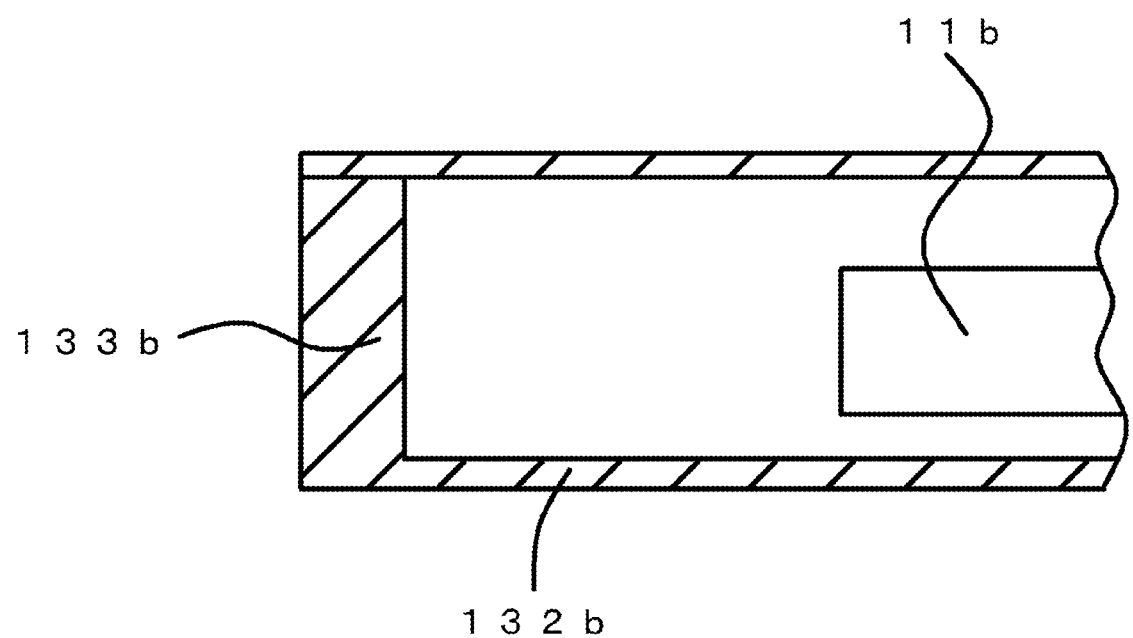
FIG. 9 is a cross-sectional view of a portion of a blower fan according to another example modification of the first preferred embodiment, illustrating a lower plate portion and its vicinity.

FIG. 9 is a cross-sectional view of a blower fan 1b according to another example modification of the above-described preferred embodiment, illustrating a lower plate portion 132b and its vicinity. The basic structure of the blower fan 1b according to the present example modification is similar to that of the blower fan 1 according to the above-described preferred embodiment. According to the present example modification, the lower plate portion 132b and a side wall portion 133b are defined by a single member.

When the lower plate portion 132b and the side wall portion 133b are defined by the single member, a heat dissipated from a heat source (not shown) is more efficiently transferred to both the lower plate portion 132b and the side wall portion 133b. The flow velocity of an air current is high at a radially outermost end of the lower plate portion 132b and an inner circumferential surface of the side wall portion 133b, and heat in surfaces of the lower plate portion 132b and the side wall portion 133b can be efficiently discharged by winds caused by an impeller 11b striking the radially outermost end of the lower plate portion 132b and the inner circumferential surface of the side wall portion 133b.

Note that the lower plate portion 132b and the side wall portion 133b may be made of a heat conductive resin and a metal, respectively, and the lower plate portion 132b and the side wall portion 133b may be integrally defined by an insert molding process. When the lower plate portion 132b is made of the resin, the lower plate portion 132b can be arranged to have a complicated shape, and a reduction in a production cost is achieved.

Figure 10:
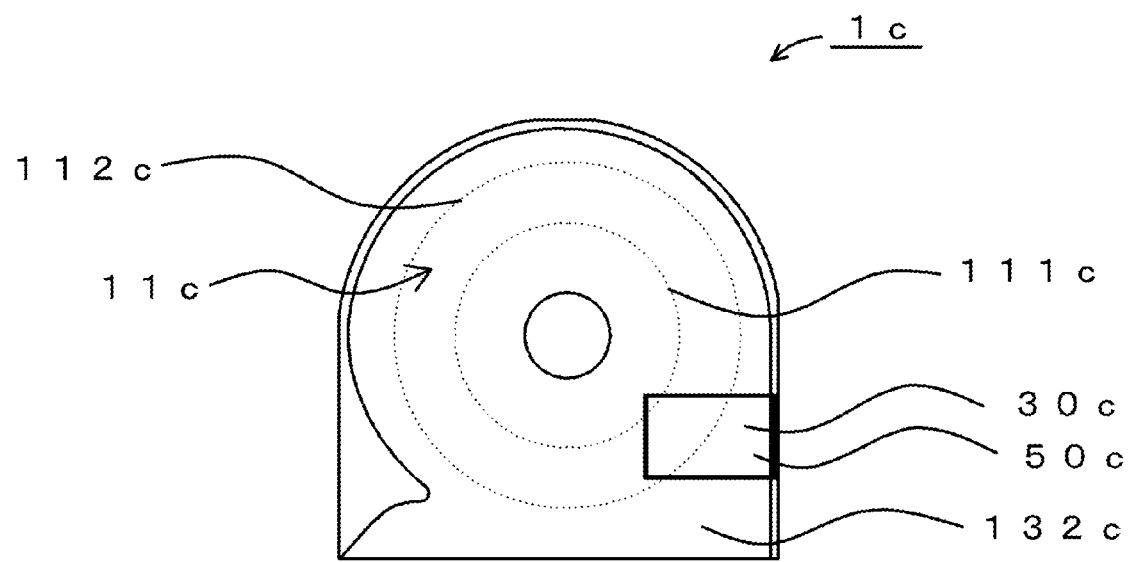
FIG. 10 is a bottom view of a lower plate portion of a blower fan according to yet another example modification of the first preferred embodiment.

FIG. 10 is a bottom view of a lower plate portion 132c of a blower fan 1c according to yet another example modification of the above-described preferred embodiment. The basic structure of the blower fan 1c according to the present example modification is similar to that of the blower fan 1 according to the above-described preferred embodiment. The lower plate portion 132c includes, in a lower surface thereof, a heat source accommodating portion 50c arranged to accommodate a heat source 30c. Inclusion of the heat source accommodating portion 50c in the lower plate portion 132c facilitates positioning of the heat source 30c and the blower fan 1c relative to each other. Note that, although the heat source accommodating portion 50c is defined by a portion of the lower surface of the lower plate portion 132c being recessed axially upward in the present example modification, this is not essential to the present invention. For example, a portion of the lower plate portion 132c, which is defined in the shape of a plate, may be arranged to project axially upward to define the heat source accommodating portion 50c. Note that at least a portion of the heat source accommodating portion 50c is preferably arranged in a region between outer circumferential ends of a plurality of blades 112c and an outer circumferential end of a blade support portion 111c. When at least a portion of the heat source accommodating portion 50c is arranged in the region between the outer circumferential ends of the blades 112c and the outer circumferential end of the blade support portion 111c, an air sucked through an air inlet 151 passes between adjacent ones of the blades 112c of the impeller 11c toward the lower plate portion 132c. When the heat source 30c is arranged under the blades 112c, a wind strikes a heat source contact portion 10c to improve cooling performance. Note that, in FIG. 10, the blades 112c and the blade support portion 111c are represented by imaginary lines.

Note that the blower fan 1 may be modified in a variety of manners.

Note that the blades 112 may not necessarily be arranged at regular intervals but may be arranged at irregular intervals. Also note that two or more channels having mutually different circumferential widths may be provided.

Note that motors according to preferred embodiments of the present invention may be either of a rotating-shaft type or of a fixed-shaft type. Also note that motors according to preferred embodiments of the present invention may be either of the outer-rotor type or of an inner-rotor type.

Note that, in the bearing mechanism 4, only at least one of the upper and lower thrust dynamic pressure bearing portions may be defined without any radial dynamic pressure bearing portion being defined.

Note that the bearing housing 232 may not necessarily be made up of the housing cylindrical portion 241 and the cap 242, but may be defined by a single member being substantially cylindrical and having a bottom.

Note that the lower plate portion 132 and the rising portion 1321 may be defined by separate members. In this case, an outer circumferential surface of the rising portion 1321 is fixed to a hole portion of the lower plate portion 132. The rising portion 1321 is produced by subjecting a metallic member to a cutting process. Note that the rising portion 1321 may be made of a nonmetallic material. For example, the rising portion 1321 may be made of a heat conductive resin.

Note that, in the blower fan 1, the air inlet 151 may be defined in only one of the upper and lower plate portions 131 and 132. In other words, regarding the blower fan 1, it is enough that the upper plate portion 131 or the lower plate portion 132 should include the air inlet 151. Also note that, in the blower fan 1, the upper plate portion 131 may be omitted from the housing 13. In this case, the upper end portion of the side wall portion 133 is fixed to a case of the notebook PC in which the blower fan 1 is installed, and the upper side of the impeller 11 is covered with this case. That is, a portion of the case of the notebook PC is arranged to define the upper plate portion 131. In other words, the case of the notebook PC includes a top plate arranged to cover an upper side of the blower fan 1 as a substitute for the upper plate portion 131 of the blower fan 1, a side plate arranged on a lateral side of the blower fan 1, and a bottom plate arranged below the blower fan 1, and the top plate includes the air inlet 151. An electronic device including the blower fan 1 as described above is able to efficiently reduce heat generated from the heat source 30 so that performance of the electronic device can be maintained and a long life of the electronic device can be achieved.

Blower fans according to preferred embodiments of the present invention are usable to cool devices inside cases of notebook PCs and desktop PCs, to cool other devices, to supply an air to a variety of objects, and so on. Moreover, blower fans according to preferred embodiments of the present invention are also usable for other purposes.

The preferred embodiments of the present invention and modifications thereof are applicable to spindle motors and disk drive apparatuses.

Features of the above-described preferred embodiments and the modifications thereof may be combined appropriately as long as no conflict arises.

While preferred embodiments of the present invention and modifications thereof have been described above, it is to be understood that additional variations and modifications will be apparent to those skilled in the art without departing from the scope and spirit of the present invention. The scope of the present invention, therefore, is to be determined solely by the following claims.

What is claimed is:
1. A blower fan comprising:
an impeller including a plurality of blades arranged to rotate about a central axis extending in a vertical direction and arranged in a circumferential direction, and a blade support portion arranged to support the blades;
a motor portion arranged to rotate the impeller; and
a housing arranged to contain the impeller; wherein
the housing includes:

a lower plate portion arranged to cover a lower side of the impeller, arranged to support the motor portion, and made of a material having a thermal conductivity of 1.0 W/(m·K) or more; and a side wall portion arranged to cover a lateral side of the impeller, connected with the lower plate portion, and made of a material having a thermal conductivity of 1.0 W/(m·K) or more;

a channel joining a space above the impeller and a space between the impeller and the lower plate portion to each other in the vertical direction is defined between adjacent ones of the blades of the impeller;

an upper plate portion arranged to cover an upper side of the impeller includes an air inlet, the air inlet being a single air inlet provided in the blower fan;

an air outlet on a lateral side of the impeller, the air outlet defined by edges of the upper plate portion, the side wall portion and the lower plate portion;

a heat source contact portion for directly contacting a heat source, the heat source contact portion being arranged directly below the lower plate portion;

the air outlet is a plane parallel to the central axis, and including one of an edge of the upper plate portion, a pair of edges of the side wall portion, and an edge of the lower plate portion that is the closest to the central axis;

the heat source contact portion and the side wall portion are arranged to at least partially overlap with each other in the vertical direction; and the heat source contact portion and the blades are arranged to at least partially overlap with each other in the vertical direction such that air is sucked from the single air inlet to cool the lower plate portion and is exhausted from the air outlet in the circumferential direction.

2. The blower fan according to claim 1, wherein a portion of the heat source contact portion is arranged radially inward of the edge of the lower wall portion.

3. The blower fan according to claim 2, wherein
the side wall portion includes a tongue portion arranged to project between the air outlet and the impeller; and
the heat source contact portion and the tongue portion are arranged to at least partially overlap with each other in the plan view.

4. The blower fan according to claim 3, wherein
in a plan view, an imaginary straight line which is parallel to the air outlet and which intersects with the central axis is defined as a first imaginary straight line, and an imaginary straight line which is perpendicular to the air outlet and which intersects with the central axis is defined as a second imaginary straight line;
of four regions divided by the first and second imaginary straight lines, a region in which the tongue portion is arranged is defined as a first region, and the three other regions are defined as a second region, a third region, and a fourth region in an order in which the three regions are arranged in a rotation direction of the impeller from the first region; and
a portion of the heat source contact portion is arranged in the fourth region.

5. The blower fan according to claim 2, wherein an area of a region over which the heat source contact portion and the side wall portion are arranged to overlap with each other in the plan view is arranged to be smaller than an area of a region of the heat source contact portion radially inside the inner circumferential surface of the side wall portion.

6. The blower fan according to claim 1, wherein
the side wall portion includes a tongue portion arranged to project between the air outlet and the impeller; and
the heat source contact portion and the tongue portion are arranged to at least partially overlap with each other in a plan view.

7. The blower fan according to claim 6, wherein
in the plan view, an imaginary straight line which is parallel to the air outlet and which intersects with the central axis is defined as a first imaginary straight line, and an imaginary straight line which is perpendicular to the air outlet and which intersects with the central axis is defined as a second imaginary straight line;
of four regions divided by the first and second imaginary straight lines, a region in which the tongue portion is arranged is defined as a first region, and the three other regions are defined as a second region, a third region, and a fourth region in an order in which the three regions are arranged in a rotation direction of the impeller from the first region; and
a portion of the heat source contact portion is arranged in the fourth region.

8. The blower fan according to claim 1, wherein an area of a region over which the heat source contact portion and the side wall portion are arranged to overlap with each other in the plan view is arranged to be smaller than an area of a region of the heat source contact portion radially inside an inner circumferential surface of the side wall portion.

9. The blower fan according to claim 1, wherein the heat source contact portion and the blades are arranged to at least partially overlap with each other in the plan view.

10. The blower fan according to claim 1, wherein the lower plate portion and the side wall portion are defined integrally with each other.

11. The blower fan according to claim 1, wherein the lower plate portion includes a heat source accommodating portion arranged to accommodate the heat source.

12. An electronic device comprising:
a case; and
the blower fan of claim 1; wherein
the case includes:
a top plate arranged to cover an upper side of the blower fan as a substitute for the upper plate portion of the blower fan;
a side plate arranged on a lateral side of the blower fan; and
a bottom plate arranged below the blower fan; and
the top plate includes the air inlet.

* * * * *